March 20, 1973     W. G. DREW     3,721,328

LID UNSCRAMBLER HAVING ROTATIONALLY RECIPROCATING GATE

Filed Aug. 21, 1970     2 Sheets-Sheet 1

INVENTOR
WILLIAM G. DREW
BY
*Kenway, Jenney & Hildreth*

ATTORNEYS

March 20, 1973  W. G. DREW  3,721,328
LID UNSCRAMBLER HAVING ROTATIONALLY RECIPROCATING GATE
Filed Aug. 21, 1970  2 Sheets-Sheet 2

CONVEYOR ADVANCE →

INVENTOR
WILLIAM G. DREW
BY
Kenway, Jenney & Hildreth
ATTORNEYS

United States Patent Office 3,721,328
Patented Mar. 20, 1973

3,721,328
LID UNSCRAMBLER HAVING ROTATIONALLY RECIPROCATING GATE
William G. Drew, % Automation Systems, Inc., 360 Amherst St., Nashua, N.H.
Filed Aug. 21, 1970, Ser. No. 65,870
Int. Cl. B65g 47/22
U.S. Cl. 198—29
11 Claims

ABSTRACT OF THE DISCLOSURE

A lid unscrambler has a gate above a lid conveyer and rotationally reciprocating back and forth along the direction of the conveyer path to interfere with the passage of stacked or layered lids, i.e. lids that are resting at least in part on another lid and hence are not lying flat on the conveyer. The angle through which the gate reciprocates is sufficiently small and the rate of reciprocation sufficiently fast, so that the gate at all times interferes with the passage of a lid raised above the conveyer. Further, the gate subjects stacked and layered lids to unscrambling forces directed both up and down the conveyer.

BACKGROUND

This invention relates to a machine for unscrambling lids and disc-like or other similar articles having a height that is smaller than the span thereof in the direction transverse to the height dimension.

The invention is useful, by way of example, in handling container lids made of synthetic resin, commonly called plastic, and which are formed by molding. The molding apparatus discharges the lids in a random fashion such that many land on the receiving surface resting at least partly on other lids. The automated further handling of these lids, whether simply for stacking or for affixing onto containers, commonly requires that the lids all be ordered into a single layer, i.e. with all lids resting fully on the desired support surface. However, since lids are of a geometry such that they can be stable when resting partially on another lid, they do not naturally assume the desired configuration but rather must be actively moved into it.

Several mechanisms have been used in the prior art for this purpose, including brushes rotating above a lid-carrying conveyer to sweep lids off the first layer lids. See for example the rotating brush unscramblers in U.S. Pats. Nos. 1,416,763 and 1,446,359 of Thom; 1,582,820 of Hungerford; 1,757,793 of Clark; and 3,306,425 of Rapp et al. However, a rotating brush as used in this prior art carrier the lid-engaging brush bristles out of contact with the lids as the brush rotates. The same bristles cannot "hold onto" a lid so long as the lid remains in engagement with the brush. Another shortcoming of rotating brush unscramblers is that they engage the lids with only a single mode of movement, and this often cannot reliably unscramble all the lids.

Accordingly, it is an object of this invention to provide an improved unscrambler for lids and other disc-like articles.

A more particular object is to provide an article unscrambler having minimum likelihood that second layer and otherwise unordered articles will pass by it.

Another object of the invention is to provide an article unscrambler that maintains continuous engagement with a second layer or otherwise unscrambled article passing thereby until the article moves away.

A further object of the invention is to provide an unscrambler of the above character capable of positive and continuous holding engagement with second layer and other unscrambled articles having upstanding surfaces.

It is also an object of the invention to provide an unscrambler of the above character that is relatively low in cost and that operates with relatively high reliability.

Other objects of the invention will in part be obvious and will in part appear hereinafter.

GENERAL DESCRIPTION

An unscrambler of lids embodying the invention has a gate disposed above a lid-transporting conveyer and rotationally reciprocating back and forth along the direction of conveyer advance to interfere with the passage of more than a single layer of lids lying flat on the conveyer. The gate is stiffly resilient and preferably has a toothed bottom lid-gripping edge. This construction enables the gate to hold on to lids that advance into the gate with a wedging, ramp surface and which otherwise tend to wedge under and past the gate without being unscrambled.

A drive mechanism swings the gate back and forth through a relatively small angle such that the gate at essentially all times interferes with the passage of a second layer lid beneath it. The drive mechanism preferably but not necessarily swings the gate forward, along the conveyer, at a speed faster than the speed of conveyer advance.

With this arrangement, the gate knocks many second layer lids backwards down the conveyer and hence off from the first layer lids on which they were resting. The gate engages other unscrambled lids and holds them against passage in such a manner that the underneath lid can be carried under it on the conveyer, leaving the second layer lid free to then drop down onto the conveyer and pass on. In still other instances of scrambling, the gate can accelerate a second layer lid forward on the conveyer and thereby disengage it from the first layer lid on which it is resting.

The invention accordingly comprises the features of construction, combination of elements, and arrangement of parts exemplified in the construction hereinafter set forth, and further comprises the several steps and the relation of one or more of such steps with respect to which the mechanism operates, all as exemplified in the followed detailed disclosure, and the scope of the invention is indicated in the claims.

BRIEF DESCRIPTION OF DRAWINGS

For a fuller understanding of the nature and objects of the invention, reference should be had to the following detailed description taken in connection with the accompanying drawings, in which.

DESCRIPTION OF ILLUSTRATED EMBODIMENT

Figure 1:
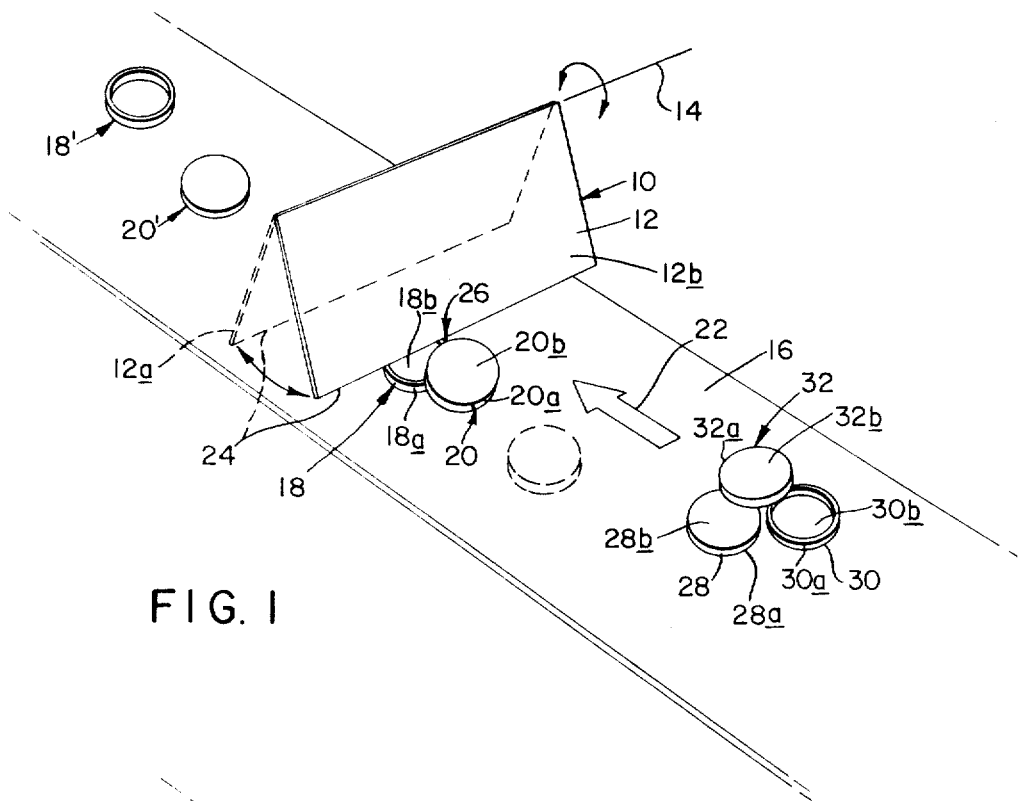
FIG. 1 is a schematic illustration of an unscrambler for lids embodying features of the invention.

FIG. 1 shows in schematic form an unscrambler 10 having a gate 12 rotationally reciprocating back and forth about a pivot axis 14 through a small arc between a forward position 12a and a back position 12b. The gate spans across a conveyer 16 that carries lids, such as lids 18 and 20, to be unscrambled in the forward direction of arrow 22. The lower edge 24 of the gate is spaced from the conveyer by more than the height of a single lid throughout the sweep of the gate between its extreme positions 12a and 12b.

A drive mechanism (not shown) rotationally reciprocates the gate to move the lower edge 24 forward and backward along the direction of conveyer advance. For most instances it is preferred that the gate rotate sufficiently fast to move the gate edge forward, along the direction of conveyer motion, faster than the conveyer advance. In fact, the gate reciprocation preferably is such that the lower edge moves sufficiently faster than the conveyer advance so that the blade engages lids with an impact imparting "striking" action rather than a mere "pushing" action.

With this arrangement, as the conveyer carries unscrambled lids 18 and 20 to the gate 12, the gate passes over lids 18 and strikes the forward edge 26 of lid 20. This knocks the latter lid backward off the lid 18 to the position shown in phantom. Lid 20 then passes under the gate, so that a brief time later both lids are upstream of the gate and appear as lid 20' closely behind lid 18'. Each lid 18 and 20 has a peripheral rim 18a, 20a extending transversely from a central cover portion 18b, 20b. The lids are shown unscrambled with the forward edge 26 of lid 20 resting on lid 18, which is resting directly on the conveyer. In this posture, lid 18 is illustrative of a first layer lid, and lid 20, prior to being unscrambled, is illustrative of a second layer lid.

FIG. 1 also shows three further lids on the conveyer 16; first layer lids 28 and 30 and a second layer lid 32 having its forward edge resting on the conveyer but its trailing end resting on the two first layer lids.

This scrambled arrangement presents the gate 12 with a wedge-like surface formed by the lid 32 cover portion 32b. This configuration is more difficult to unscramble than is the unscrambled configuration of lids 18 and 20 where the lid 20 rim provides an upstanding forward edge that the gate 12 readily engages to knock that lid 20 off from the first layer lid 18. Nevertheless, as the second layer lid 32 commences to pass under the gate 12, the gate edge 24 engages it and prevents the lid from further advance. The holding engagement of the gate edge against the inclined lid cover portion 32b typically initially arrests the forward motion of the first layer lids 28 and 30. That is, the lids slip relative to the conveyer, which advances continuously. However, the vigorous and relatively rapid reciprocation of the gate 12, coupled with the continual advancing movement of the conveyer 16, frequently urges the lid 32 upward and backward relative to the lids 28 and 30 on which it is resting. This allows the first layer lids 28 and 30 to pass under the gate, followed by the lid 32 which is then free to drop onto the conveyer 16.

Another action of the unscrambler 10 with a lid 32 scrambled so as to present an inclined surface to the gate edge 24 is that the second layer lid 32 alone gets thrown backward down the conveyer and hence off the first layer lids 28 and 30, or that all three lids get thrown backward. Either action eventually results in all three lids 28, 30 and 32 resting directly on the conveyer 16 and hence in an unscrambled condition.

Figure 2:
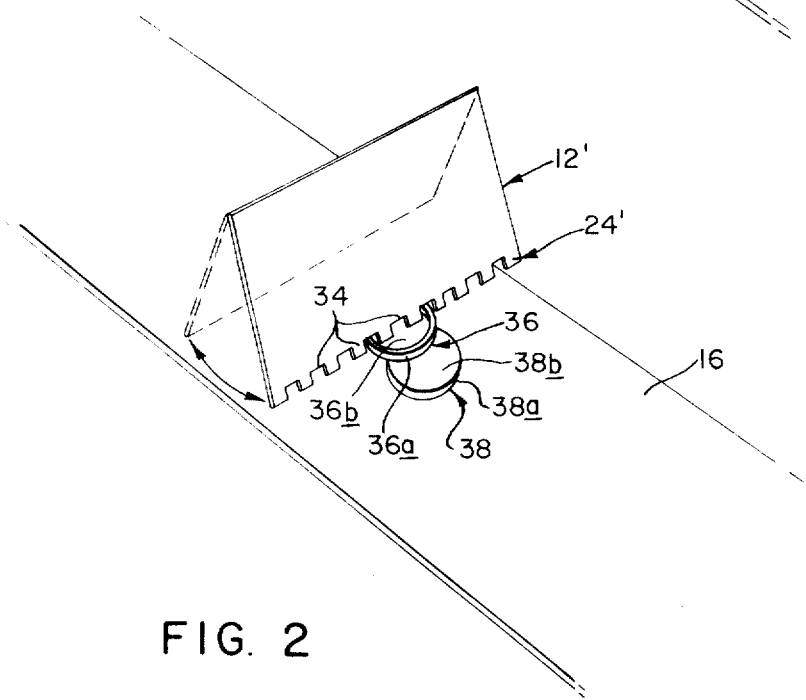
FIG. 2 shows another form of the unscrambler in which the unscrambling gate has a toothed lower edge.

In FIG. 2, the unscrambler gate 12' has a toothed lower edge 24'. That is, the gate is notched along the lower edge to leave a succession of tooth-like projections 34 spaced apart along the span of the gate across the conveyer and forming the edge 24'.

As indicated in FIG. 2, these projections enable the gate positively to engage the upstanding rim of a lid 36 resting on another lid 38. This engagement of the blade projections with the lid rim assures that the lid 36 does not pass under the blade until it has become disengaged from the lid 38 and become a first layer lid.

Figure 3:
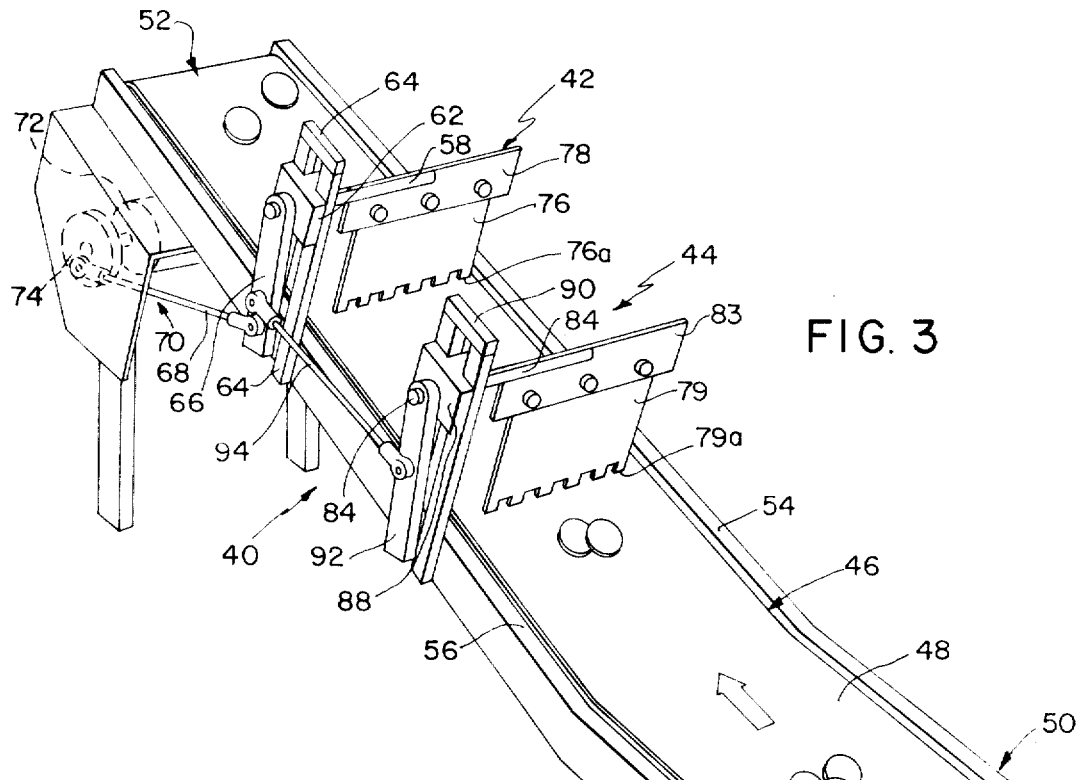
FIG. 3 shows a construction of a two-stage unscrambler in accordance with the invention.

With reference to FIG. 3, a two-stage lid unscrambler 40 in accordance with the invention has two rotationally reciprocating gates 42 and 44 spaced apart along an inclined belt conveyer 46. The illustrated conveyer has an endless belt 48 running from a lid-receiving load end 50 to a lid-discharging output end 52; the conveyer is inclined upward to the output end to deliver the unscrambled lids at the output end at the height of further lid-handling equipment. Side rails 54 and 56 extend along either side of the conveyer belt to maintain the lids on it. This construction and the further details of the conveyer, as well as of the conveyer drive means, can follow conventional practices. However, it will be seen that the conveyer is of a type that carries the articles on a conveyance surface, along which the articles can slip upon encountering an obstruction.

The gate 42 spans the conveyer belt intermediate the ends 50 and 52 carried on a shaft 58 which is journaled adjacent one end to a mounting block 62. The block in turn is mounted on a post 64 secured to the side of the conveyer. The mounting of the block on the post is adjustable in the direction normal to the conveyer path to raise or lower the gate relative to the conveyer.

The shaft 58 protrudes outward from the mounting block 62 and a crank arm 66 is secured to this protruding length of the shaft, preferably with a key or the like. One end of a linking drive arm 68 is pivotally connected to the crank arm remote from its connection to the shaft 58. The other end of the drive arm is pivotally connected to a reciprocating drive mechanism indicated generally at 70. The illustrated drive mechanism includes an electric motor 72 driving a sprocket 74 to which the drive arm 68 is pivotally connected, as shown.

Figure 4:
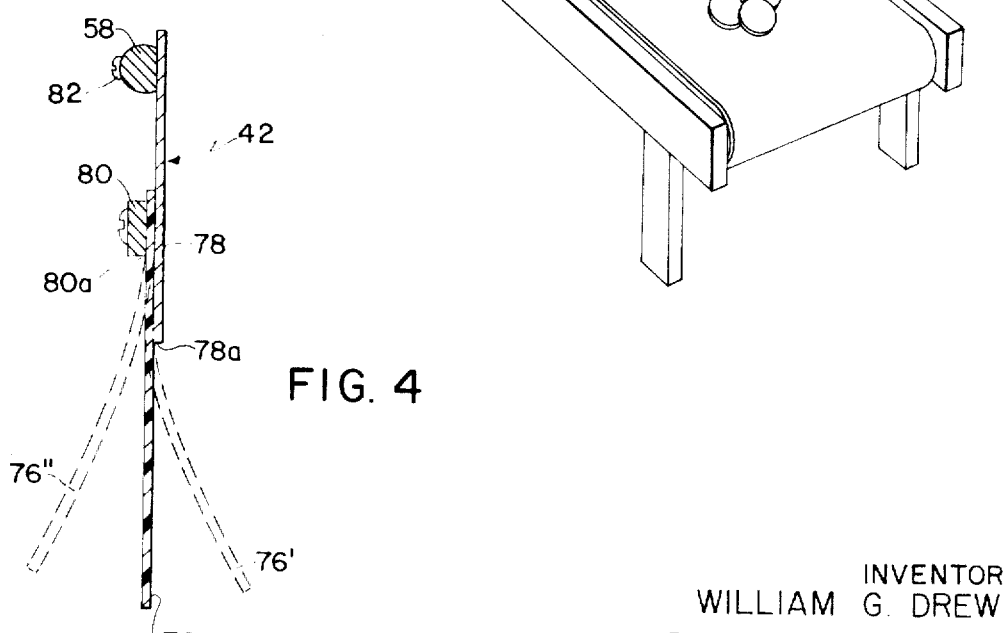
FIG. 4 shows a side cross-sectional view of the gate construction in the unscrambler of FIG. 3 and taken along line 4—4 thereof.

With reference to FIGS. 3 and 4, the gate 42 is constructed with a firmly resiliently flexible barrier portion or blade 76 depending from the shaft and secured to it by way of a plate 78 and a clamp bar 80. The plate 78 is secured along one edge to the shaft, illustratively along a flattened surface of the shaft, by threaded fasteners 82. Roughly midway between this edge and the plate lower edge 78a, the clamp bar 80 is fastened to it with the upper edge of the blade 76 clamped therebetween.

The gate 44, FIG. 3, is constructed in a like manner with a resilient blade 79 clamped to a plate 83 that is secured to a shaft 84. Shaft 84 is journaled to a block 88 which is adjustably secured on a post 90. One end of a crank arm 92 is keyed to the shaft 84 and the other end of the arm 92 is pivotally connected to one end of a linking drive arm 94. The other end of arm 94 is fastened with a pivot connection to the crank arm 66 to be driven with it. The two gates 42 and 44 preferably are spaced apart along the conveyer by a distance of at least several lid diameters.

With this arrangement, operation of the motor 72 rotates sprocket 74, driving it to reciprocate the arm 68 and the arm 94 linked with it. This reciprocation of the drive arms rotationally reciprocates the crank rams 66 and 92, and they in turn rotationally reciprocate the gates 42 and 44 by way of the shafts 58 and 84. The unscrambler is preferably assembled so that the gates reciprocate equally back and forth about a central position that is normal to the conveyer.

As described above with reference to FIGS. 1 and 2, this reciprocating action unscrambles lids which the conveyer carries into engagement with the gates. The second gate 42 is provided largely to provide a safety margin, i.e. to unscramble any lids which remain unscrambled after passage by the first gate 44.

With further reference to FIG. 3, the lower edges 76a and 79a of the blades on the illustrated gates are toothed in the manner shown in FIG. 2. Each toothed projection is sufficiently narrow so that at least one projection will fit within the rim of a lid. FIG. 2 shows narrower projections, as preferred, so that at least one projection can engage the inside of a lid rim along a chord removed from the diameter of the lid by only slightly less than the lid radius. This arrangement enhances the ability of the blades to catch and hold a second layer lid having its rim facing upward.

The blades are flexible with a firm or stiff resiliency as noted. This flexibility enables the blade to deform to the extent required to hold on to, i.e. remain in engagement with, a second layer lid as the gate reciprocates back and forth. By way of example, the blade can be made of polyethylene or other synthetic resin material.

As shown in FIG. 4 for the gate 42, the lower edge 78a of plate 78 and the clamping bar lower edge 80a are not opposite each other. Instead they are spaced apart a significant distance along the blade 76 clamped therebetween. With this arrangement, when the blade bends backward as to the position 76', the bending stresses in the blade are concentrated adjacent edge 78a. When the blade bends forward to position 76'', however, the concentration of bending stresses in it is adjacent edge 80a. Hence the illustrated gate construction distributes bending stresses in the blade and thereby minimizes the likelihood that the blade material will receive significant fatigue stress. The gate 44 preferably employs a like construction.

The gates 42 and 44 are mounted with the blade lower edges 76a and 78a spaced from the conveyer surface by approximately one and one-half times the height of the lid or other article being unscrambeld when the gate is in the central position of its reciprocating travel. Each gate typically rotates from this central position in either direction through an arc such that the blade lower edge is about two lid heights from the conveyer. However, the gate can rotate through a larger arc so long as the rate of rotation is sufficiently faster than the rate of conveyer advance so that a second layer did not pass freely under the gate. By way of example, in a typical unscrambler 40, the conveyer advances at a rate of 1200 inches per minute, and the gates reciprocate at a rate such that the lower edges move forward at 1400-1600 inches per minute.

The provision of two gates as in the unscrambler 40 provides an unscrambling action in addition to that of a single gate. Specifically, in the event a second layer lid passes the first gate 44 on the conveyer without being removed from the lids on which it is resting, the forward swing of this gate throws the lid forward. In the event the lid is then still resting on another lid when it reaches the second gate 42, the second gate typically throws the lid backward. The lid then in effect bounces back and forth between the two gates until it assumes the position of a first layer lid, i.e. comes to rest flat on the conveyer.

Although both gates of the unscrambler 40 typically are mounted with the blade lower edges at essentially the same spacing from the conveyer, in an alternative arrangement the blade of the first gate 44 is mounted slightly higher above the conveyer. One reason for this raised arrangement of the first gate is that it allows some second layer lids to squeeze by the first gate with little bending of the first gate blade, and then the first gate throws the second layer lid forward. As just described, this forward throwing of a second layer lid by the first gate quickly results in the lid being unscrambled.

The unscrambler can, of course, be made with more than the two gates shown in FIG. 3. Also, different ones of the gates can rotate through different-length arcs and with different distances between their pivot lines and their bottom edges. With further regard to toothed gates as shown in FIG. 2, each projection preferably is square-cornered or even flares outward at its lower edge, rather than being saw-toothed.

It will thus be seen that the objects set forth above, among those made apparent from the preceding description, are efficiently attained, and since certain changes may be made in the above constructions and in the above unscrambling method without departing from the scope of the invention, it is intended that all matter contained in the above description or shown in the accompanying drawings shall be interpreted as illustrative and not in a limiting sense.

It is also to be understood that the following claims are intended to cover all of the generic and specific features of the invention herein described, and all statements of the scope of the invention which, as a matter of language, might be said to fall therebetween.

Having described the invention, what is claimed as new and secured by Letters Patent is:

1. An unscrambler for ordering disc-like articles on a transport into a single layer, said unscrambler comprising:
   (A) transport means forming a conveyance surface for carrying the articles forward along a path and along which the articles are free to slip upon encountering an obstruction,
   (B) first gate means having an article-engaging lower edge and mounted above said transport means with said lower edge extending transverse to said path with a minimum spacing of said lower edge above said conveyance surface of not less than the height of a single article lying flat on said surface, and
   (C) drive means coupled to said gate means for imparting an article-unscrambling reciprocation to said gate means, said drive means reciprocating said gate means to move the lower edge thereof back and forth along the detection of transport advance with the movement of the lower edge forward along said path being faster than the speed of transport forward advancing motion along said path, and said reciprocation of said gate means moving said lower edge thereof into one of a holding engagement and a striking impact with an article which is at least partially supported on another article on said transport means.

2. An unscrambler for ordering disc-like articles on a transport into a single layer, said unscrambler comprising:
   (A) transport means forming a conveyance surface for carrying the articles forward along a path and along which the articles are free to slip upon encountering an obstruction.
   (B) first gate means having an article-engaging lower edge and mounted above said transport means with said lower edge extending transverse to said path with a minimum spacing of said lower edge above said conveyance surface of not less than the height of a single article lying flat on said surface, and
   (C) drive means coupled to said gate means for imparting an article-unscrambling reciprocation to said gate means, said drive means reciprocating said gate means to move said lower edge thereof back and forth along the direction of transport advance and through an arc sufficiently small and at a rate relative to the rate of transport advance such that the gate means swings both back and forth at least once in a time less than the time for the transport means to advance an article past the travel of said gate means lower edge along said path, said reciprocation of said gate means moving said lower edge thereof into one of a holding engagement and a striking impact with an article which is at least partially supported on another article on said transport means.

3. An unscrambler for ordering disc-like articles on a transport into a single layer, said unscrambler comprising:
   (A) transport means forming a conveyance surface for carrying the articles forward along a path and along which the articles are free to slip upon encountering an obstruction,
   (B) first gate means having an article-engaging lower edge and mounted above said transport means with said lower edge extending transverse to said path with a minium spacing of said lower edge above said conveyance surface of not less than the height of a single article lying flat on said surface,
   (C) drive means coupled to said gate means for imparting an article-unscrambling reciprocation to said gate means, said reciprocation of said gate means moving said lower edge thereof back and forth along the direction of transport advance and into one of a holding engagement and a striking impact with an article which is at least partially supported on another article on said transport means, and (D) said gate means further having:
(1) an upper edge extending longitudinal to said lower edge and adjacent to which said gate means is coupled to said drive means, and
(2) a barrier portion between said edges and which is stiffly resilient to flex during said reciprocating movement of said gate means with an article in said holding engagement between said gate means lower edge and said transport means.

4. An unscrambler as defined in claim 1 in which said gate means has a plurality of depending portions forming said lower edge thereof and spaced apart by recessed portions that are further removed from said transport means than said depending portions.

5. An unscrambler for ordering disc-like articles on a transport into a single layer, said unscrambler comprising:
(A) transport means forming a conveyance surface for carrying the articles forward along a path and along which the articles are free to slip upon encountering an obstruction,
(B) first gate means having an article-engaging lower edge and mounted above said transport means with said lower edge extending transverse to said path with a minimum spacing of said lower edge above said conveyance surface of not less than the height of a single article lying flat on said surface,
(C) drive means coupled to said gate means for imparting an article-unscrambling reciprocation to said gate means, said reciprocation of said gate means moving said lower edge thereof back and forth along the direction of transport advance and into one of a holding engagement and a striking impact with an article which is at least partially supported on another article on said transport means, and
(D) said gate means including:
(1) a resilient blade having opposed side faces and having a lower edge forming said gate means lower edge, and
(2) a relatively non-resilient frame for mounting said blade and for coupling to said drive means to receive said reciprocating movement, and having blade mounting means engaging said blade faces at different spacings from said blade lower edge.

6. An unscrambler for ordering disc-like articles on a transport into a single layer, said unscrambler comprising:
(A) transport means forming a conveyance surface for carrying the articles forward along a path and along which the articles are free to slip upon encountering an obstruction,
(B) first gate means having an article-engaging lower edge and mounted above said transport means with said lower edge extending transverse to said path with a minimum spacing of said lower edge above said conveyance surface of not less than the height of a single article lying flat on said surface,
(C) drive means coupled to said gate means for im-said gate means, said reciprocation of said gate means moving said lower edge thereof back and forth along the direction of transport advance and into one of a holding engagement and a striking impact with an article which is at least partially supported on another article on said transport means,
(D) second gate means having an article-engaging lower edge and mounted above said transport means with said lower edge extending transverse to said path with a minimum spacing of said lower edge above said conveyance surface of not less than the height of a single article lying flat on said surface, and
(E) in which said drive means imparts said article-unscrambling reciprocation to said second gate means.

7. An unscrambler for ordering lid-like articles carried on a conveyer into a configuration of selected maximum thickness measured in terms of layers of said articles, said unscrambler comprising:
(A) a conveyor for carrying the articles forward along a path between a load location at which it receives the articles and an output location at which it discharges the articles,
(B) a first unscrambling gate
(1) having a barrier portion with a lower edge,
(2) disposed above said conveyer with said barrier portion spanning across said conveyer at a third location spaced from and intermediate said load and output locations to receive only articles being moved by said conveyer,
(3) mounted for rotational reciprocation, about a rotation axis extending transversely across said conveyer, to sweep said lower edge back and forth along the conveyer with a minimum spacing of said lower edge from said conveyer not less than said selected maximum thickness, and
(C) drive means coupled to said gate for rotationally reciprocating said gate back and forth through a fixed arc and at a rate to move said gate edge forward along said conveyer faster than the speed of conveyer forward motion to strikingly engage said gate barrier portion against articles at least partially resting on another article in the upper layer thereof below said maximum thickness.

8. An unscrambler as defined in claim 7 in which
(A) said drive means reciprocates said first gate means through an arc about an axis spaced from said lower edge thereof in the direction away from said conveyer, and
(B) said arc and spacing are sufficient to lift said lower edge of said gate means, during said reciprocation thereof, from said minimum spacing to above said conveyer to at least two times the height of an article lying flat on said surface.

9. An unscrambler for ordering lid-like articles carried on a conveyer into a configuration of selected maximum thickness measured in terms of layers of said articles, said unscrambler comprising:
(A) a conveyer for carrying the articles forward along a path between a load location at which it receives the articles and an output location at which it discharges the articles,
(B) a first unscrambling gate
(1) having a flexible barrier portion with a lower edge,
(2) disposed above said conveyer with said barrier portion spanning across said conveyer at a third location spaced from and intermediate said load and output locations to receive only articles being moved by said conveyer,
(3) mounted for rotational reciprocation, about a rotation axis extending transversely across said conveyer, to sweep said lower edge back and forth along the conveyer with a minimum spacing of said lower edge from said conveyer not less than said selected maximum thickness,
(C) drive means coupled to said gate for rotationally reciprocating said gate back and forth through a fixed arc to strikingly engage said gate barrier portion against articles at least partially resting on another article in the upper layer thereof below said maximum thickness,
(D) a second unscrambling gate
(1) having a flexible barrier portion with a lower edge, (2) disposed above said conveyer with said barrier portion thereof spanning across said conveyer intermediate said third and output locations and mounted for rotational reciprocation, about a rotation axis extending transversely across said conveyer, to sweep said lower edge back and forth along the conveyer with a minimum spacing of said lower edge from said conveyer not less than said thickness, and (E) means for swinging said second gate back and forth through a fixed arc.

10. An unscrambler for ordering skirted lid-like articles carried on a moving conveyer into a configuration of selected maximum thickness measured in terms of layers of said articles, said unscrambler comprising:

(A) conveyer means for carrying the articles forward along a path by means of gravitational friction between the article and the conveyer means so that the article is free to slip relative to said conveyer means when the article encounters an obstruction, (B) unscrambling gate means having a barrier portion with a lid-engaging lower edge and mounted with said barrier portion spanning across said conveyer means with said lower edge thereof extending thereacross transverse to said path, and (C) drive means coupled with said gate means and imparting an article-unscrambling rotational reciprocation to said gate means, said reciprocation of said gate means being about a rotation axes extending transversely across said path and moving said lower edge of said gate means back and forth along said conveyer means with the movement forward along said conveyer means being faster than the speed of conveyer means forward motion, thereby to move said lower edge of said gate means interferingly to engage an article which at least partially protrudes above said conveyer means by more than said thickness and, by virtue of said interfering engagement, to block the passage of that article by said gate means and to disturb the disposition of that article on said conveyer means.

11. An unscrambler as defined in claim 10 in which:

(A) said barrier portion of said gate means is sufficiently resilient to flex during said reciprocation thereof with an article engaged between the gate means lower edge and said transport means, and (B) said drive means reciprocates said gate means to impart one of a holding engagement and a striking impact between said gate means lower edge and an article protruding on said conveyer means above said thickness.

References Cited

UNITED STATES PATENTS

| | | | |
|---|---|---|---|
| 1,416,763 | 5/1922 | Thom | 198—29 |
| 2,564,944 | 8/1951 | Witte | 221—164 |
| 2,583,707 | 1/1952 | Prickett | 198—30 |
| 1,688,982 | 10/1928 | Molins | 198—29 |

RICHARD AEGERTER, Primary Examiner

U.S. Cl. X.R.

198—33 R